P. H. GENTZEL.
BEARING CLAMP FOR ENGINE SHAFTS.
APPLICATION FILED NOV. 28, 1919.
1,410,058.
Patented Mar. 21, 1922.
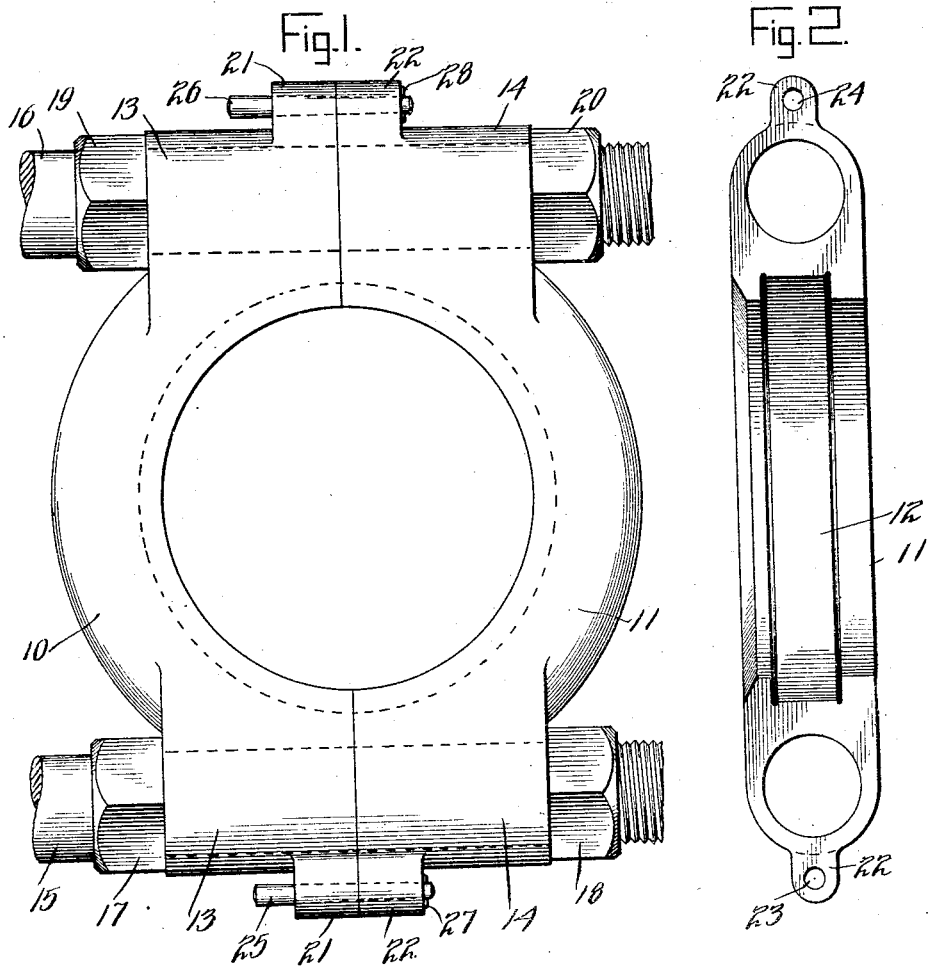
Inventor
Perry H. Gentzel
Attorneys

UNITED STATES PATENT OFFICE.

PERRY H. GENTZEL, OF NEWTON, MASSACHUSETTS.

BEARING CLAMP FOR ENGINE SHAFTS.

1,410,058.  Specification of Letters Patent.  Patented Mar. 21, 1922.

Application filed November 28, 1919. Serial No. 341,179.

*To all whom it may concern:*

Be it known that I, PERRY H. GENTZEL, a citizen of the United States, residing at Newton, in the county of Middlesex and State of Massachusetts, have invented certain new and useful Improvements in Bearing Clamps for Engine Shafts, of which the following is a specification.

In the manufacture of bearings for engine crank shafts, such as are commonly employed for oil burning engines, as well as engines of other types, it is important that the main bearing clamps should be so formed that perfect alignment may be obtained and maintained, particularly whereby perfect alignment may be secured or restored after the parts have been taken down for any particular purpose.

The object of my said invention is to provide an improved method of forming and certain improvements in the details of construction, whereby a bearing clamp is provided that may be readily ground, so that its respective parts will be in true alignment and whereby said alignment may be maintained, or taken down and restored as often as it is desired, all of which will be hereinafter more fully described.

Referring to the accompanying drawing which is made a part hereof, and on which similar reference characters indicate similar parts, Figure 1 is a side elevation of the main bearing clamp for the crank-shaft of an engine constructed in accordance with my said invention, and Figure 2 a face view of one half of said clamp, showing the face that abuts against the other half.

The bearing clamp illustrated in said drawings is in most details of an ordinary construction, such as is in common use, comprising two halves 10 and 11 of duplicate formation, having races 12 formed in their interior surfaces for containing the rollers of the roller bearings, and having transversely extending wings 13 and 14 on each side thereof, through which the clamping rods 15 and 16 extend. Said parts 10 and 11 are securely clamped together to form practically an integral bearing by the nuts 17 and 18 on rod 15, and 19 and 20 on rod 16.

On each of said transverse wings and adjacent to the abuting faces of the two parts are formed projecting ears 21 and 22, in which are formed tapered holes 23 and 24 which are made to register, and in which are driven tapered pins 25 and 26 secured in place by cotter-pins 27 and 28 respectively.

In the manufacture of clamps of the character described the two parts 10 and 11 are fitted together, and the pins 25 and 26 driven into place and secured. The interior bearing surfaces are then ground and are held during this operation in fixed relative position by means of said pins 25 and 26. When the bearing is finished and the clamp is taken apart for assembling, it is an easy matter to restore the two parts 10 and 11 to the previously determined relationship and alignment by driving pins 25 and 26 back into their seats until they attain the same position that they had before. By this means the bearing clamp can be changed, taken down, and reassembled quickly and without any danger of destroying the former alignment, thus maintaining uniform efficiency in service.

Having thus fully described my said invention, what I claim as new and desire to secure by Letters Patent, is:

1. A bearing clamp for shaft bearings comprising two parts clamped together and formed with registering and aligned bearing surfaces and with projecting ears on the adjacent edges of said parts having perforations, and pins removably fitted in said perforations to effect alignment of the said two parts, substantially set forth.

2. A main bearing clamp for engine shafts, comprising two parts, clamping rods for securing said parts together, each of said parts being formed with a projecting ear on opposite edges at the abutting faces of said parts having tapered perforations therein to effect alignment of the said two parts, and tapered pins driven into and secured in said perforations, substantially as set forth.

3. A bearing clamp for shaft bearings comprising two parts, clamping rods for securing said parts together, each of said parts being formed with a projecting ear on opposite edges at the abutting faces of said parts having tapered perforations therein, tapered pins adapted to be driven into said tapered perforations to a predetermined point for aligning the two parts of the clamp and means for locking the tapered pins in position.

In witness whereof, I have hereunto set my hand and seal at Boston, Massachusetts, this twenty-first day of November, A. D. nineteen hundred and nineteen.

PERRY H. GENTZEL. [L. S.]